United States Patent

Vandendriessche et al.

[11] Patent Number: 5,910,067
[45] Date of Patent: Jun. 8, 1999

[54] FINAL DRIVE GEAR RATIO SELECTION SYSTEM FOR A HARVESTER

[76] Inventors: Jean-Pierre Vandendriessche, Koutergatstraat 20, B-9420 Erpe-Mere; Stephan P.G. Deneir, Strobomestraat 19, B-8890 Moorslede; Dries M.J. Depreitere, Pereboomstraat 5, B-8680 Koekelare; Gino L. Deceuninck, Acacialaan 9, B-8470 Gistel, all of Belgium

[21] Appl. No.: 08/891,965

[22] Filed: Jul. 14, 1997

[30] Foreign Application Priority Data

Jul. 20, 1996 [GB] United Kingdom .................. 9615281

[51] Int. Cl.$^6$ ............................. B60K 41/20; B60K 41/26
[52] U.S. Cl. ................................. 477/92; 477/94; 74/335
[58] Field of Search ............................. 477/92–94, 183; 475/140; 74/335–336 R

[56] References Cited

U.S. PATENT DOCUMENTS

| 3,507,371 | 4/1970 | Richard et al. | 477/92 X |
| 3,543,891 | 12/1970 | Mathers | 477/92 |
| 3,669,234 | 6/1972 | Mathers | 477/92 |
| 3,834,499 | 9/1974 | Canderello et al. | 477/94 X |
| 3,876,033 | 4/1975 | Shore | 477/92 X |
| 4,119,185 | 10/1978 | Phinney | 477/92 X |
| 4,617,840 | 10/1986 | Ymakawa et al. | 477/94 X |

*Primary Examiner*—Khoi Q. Ta

[57] ABSTRACT

A method and a system are disclosed for selecting the final drive gear ratio in a harvester. The method comprises the steps of selecting the desired ratio by manually depressing a button on a control panel, automatically activating a brake to bring the harvester to a standstill in response to the depression of the button on the control panel, and activating a gear selection mechanism to select the desired gear ratio only after the harvester has come to a complete stop.

13 Claims, 4 Drawing Sheets

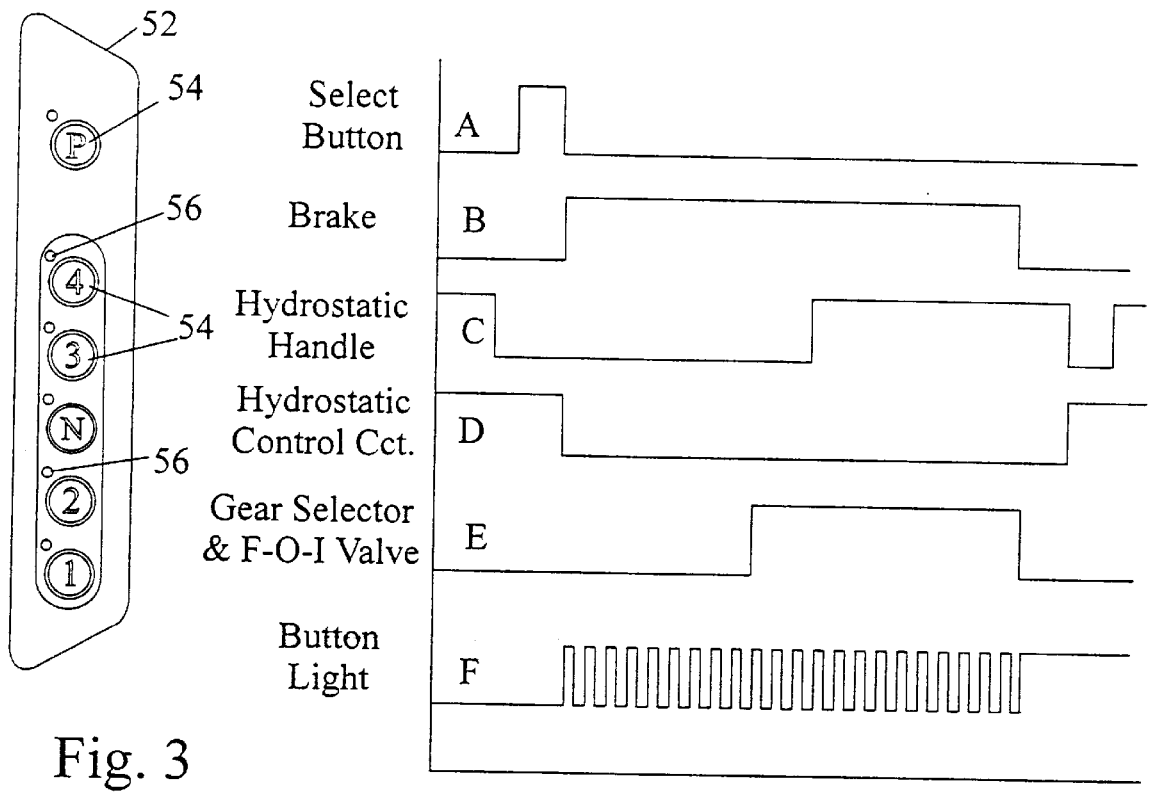
Fig. 3
Fig. 5
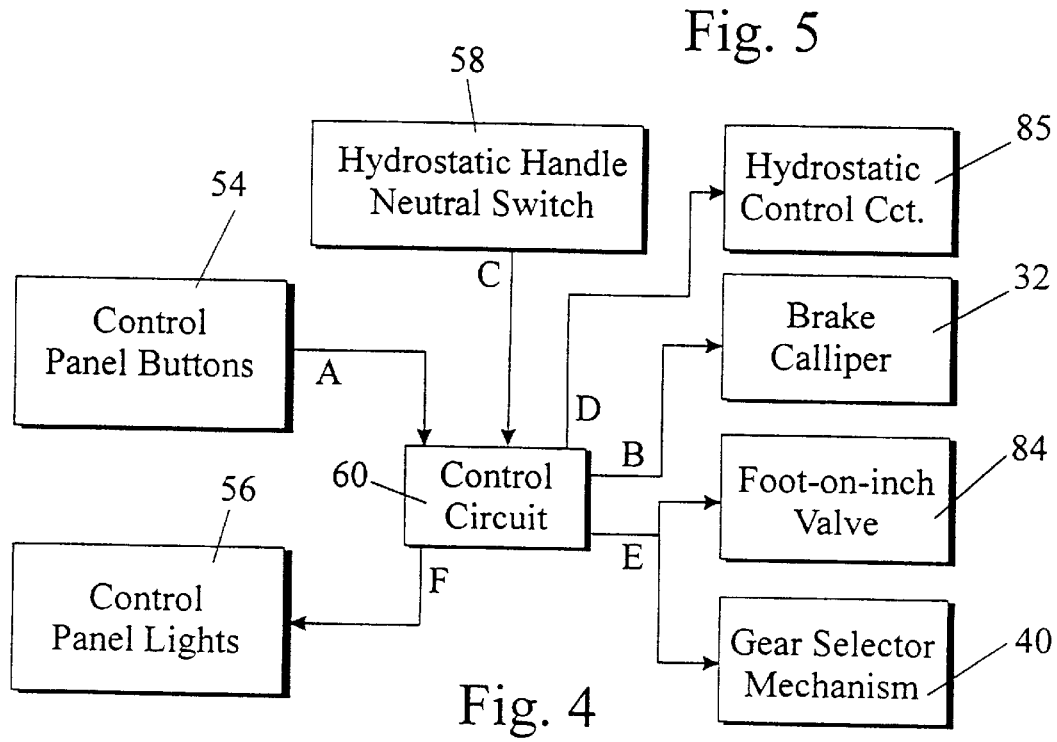
Fig. 4

FINAL DRIVE GEAR RATIO SELECTION SYSTEM FOR A HARVESTER

BACKGROUND OF THE INVENTION

1. Field of Art

The present invention relates to a system for selecting the drive ratio of a multiple ratio mechanical gearbox in a harvester having an engine connected to drive the harvester through a transmission line that includes the said mechanical multiple ratio gearbox and having a brake for preventing movement of the harvester.

2. Description of Prior Art

The multiple ratio gearbox comprises a first shaft, a first gear mounted fast in rotation with the first shaft, a second shaft having a second gear rotatably mounted thereon, the first and second gears being in permanent meshing engagement, and a gear selector for selectively coupling the second gear for rotation with the second shaft to permit torque to be transmitted between the first and second shafts, wherein the gear selector comprises a cog fast in rotation with the second gear, a carrier fast in rotation with the second shaft, and a synchronizer surrounding the carrier and having internal teeth permanently engaging between external teeth of the carrier, the synchronizer being slidable relative to the carrier into engagement with external teeth of the cog fast in rotation with the second gear.

An important difference between a transmission used in a harvester and one used in a road vehicle is that in a road vehicle gear changes can be carried out while the vehicle is in motion, whereas in a harvester final drive gear selection is carried out with the vehicle at a standstill. Thus, while synchromesh is used in road vehicles to bring the speed of one gearbox shaft gradually up to the speed of another shaft to effect smooth gear changes, in a harvester a synchronizer is used not for speed matching but for position or phase matching to ensure that the teeth of the carrier are correctly aligned with the teeth of the cog that is driven by the first shaft.

Because of the construction of the gearbox of a harvester, it is essential to ensure that the harvester is at a complete standstill before making any attempt at gear changing. With a combine harvester in which the transmission line comprises a hydraulic transmission in addition to the mechanical gearbox, the driver conventionally moves the hydrostatic handle into a neutral position to bring the vehicle to a stop before selecting a change of gear. In most cases however, and most certainly when on a slope, it was also expected of the driver to also operate a foot brake to ensure that the vehicle was brought and maintained at a perfect standstill before selecting a change of gear. However, experience taught that because of the extra effort required of the driver to operate the foot pedal, this would sometimes not be carried out correctly impeding a proper change of gear and obliging the driver to make another attempt before the required gear selection could be effected.

The present invention seeks to provide a method and system for gear selection in a harvester that place fewer demands on the driver and ensure a smooth gear change.

In accordance with a first aspect of the invention, there is provided a method of selecting a final drive gear ratio in a harvester that comprises selecting the desired ratio by manually depressing a button on a control panel, automatically activating a brake to bring and/or maintain the harvester at a standstill in response to the depression of the button on the control panel, and activating a gear selection mechanism to select the desired gear ratio only after the harvester has come to a complete stop.

SUMMARY OF THE INVENTION

In accordance with a second aspect of the invention, there is provided a system for selecting the drive ratio of a multiple ratio mechanical gearbox in a harvester having an engine connected to drive the harvester through a transmission line that includes the said mechanical multiple ratio gearbox and having a brake for preventing movement of the harvester, the system comprising:

an electrical gear selection panel having a plurality of buttons for manual selection of the desired drive ratio, a gear selector mechanism on the gearbox, a gear change actuator for displacing the gear selector mechanism to select the desired gear, and an electrical control circuit for energising the gear change actuator in response to manual depression of a button on the gear selection panel, whereby the electrical control circuit is operative to actuate the brake to bring and maintain the harvester at a complete stop before energising the gear change actuator to effect a gear change.

In the system and method of the invention, if the hydrostatic handle is in its neutral position or has been brought to neutral by the operator, depression of a button to select a gear actuates a brake of the harvester but does not start activating the gear selection mechanism of the gearbox for a predetermined period of time until the harvester has come and is maintained at a complete stop. Thus, apart from moving the hydrostatic handle to its neutral position, the driver is not called upon to take special steps to stop the harvester or maintain it at a complete standstill. Consequently, even an inexperienced driver will not cause damage to the internal components of the gearbox or will not experience difficulty in changing gear through accidentally attempting to change gears while the harvester is still moving.

In an alternative embodiment, instead of relying on the predetermined time lapse between the depression of the gear selection button and the effective actuation of the gear selection mechanism in the gearbox, the speed of the harvester is monitored by a speed sensor to ensure that the harvester has stopped completely before activating the gear selection mechanism.

Because of the fact that in the invention, gear selection is effected indirectly, there will be a finite time between the depression of a selection button on the control panel and the eventual completion of the engagement of the desired gear ratio. It is preferred for this reason that a warning be provided to the driver that a gear change is in progress. The warning may, for example, be a light that flickers by the selection button during the gear change but remains on permanently once a new gear has been engaged.

BRIEF DESCRIPTION OF THE DRAWINGS

The invention will now be described further, by way of example, with reference to the accompanying drawings, in which:

FIG. 3 is a schematic representation of the part of the control panel of the harvester concerned with selection of the final drive gear ratio, FIG. 4 is a block diagram showing the connections to a control circuit for automating final drive gear ratio selection, FIG. 5 shows six waveforms representing the signals on the input and the output lines of the control circuit in FIG. 4 during a gear change cycle.

DETAILED DESCRIPTION OF THE INVENTION

Figure 6:
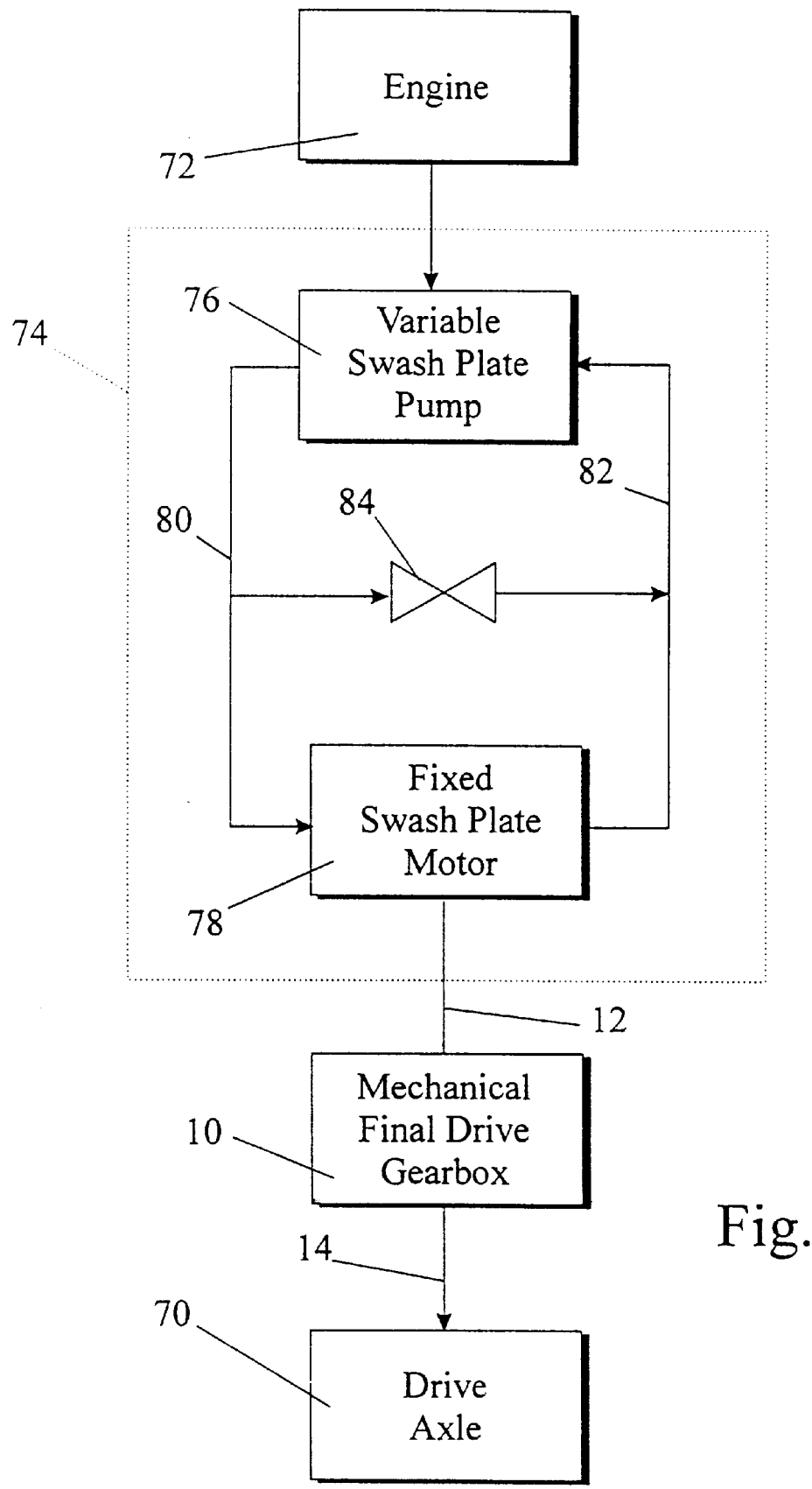
FIG. 6 is a schematic representation of the entire transmission line of the harvester starting at the engine and ending at the drive axle.

Referring first to FIG. 6, this shows the complete transmission line of a harvester. Torque developed by an engine 72 is applied to a drive axle 70 first through a hydrostatic transmission, generally designated 74, then through a mechanical final drive gearbox 10. The hydrostatic transmission comprises a variable swash plate pump 76 driven by the engine 72 and connected by a supply line 80 and a return line 82 to a fixed swash plate motor 78. It will be appreciated that the flow direction is reversed when the swash plate of the pump 76 is set for reverse movement of the harvester. A so-called "foot-on-inch" valve 84, when open, connects the supply and return lines of the pump 76 to one another in parallel with the motor 78 to allow the motor 78 to turn freely. The input shaft 12 of the gearbox 10 is driven by the motor 78 while its output shaft 14 leads to the drive axle.

The hydrostatic transmission 74 is used to control the speed and torque while the harvester is in motion and also to set the direction of travel, as already mentioned. The mechanical gearbox 10 on the other hand sets the final drive ratio and this ratio is selected while the harvester is at a standstill.

Figure 1:
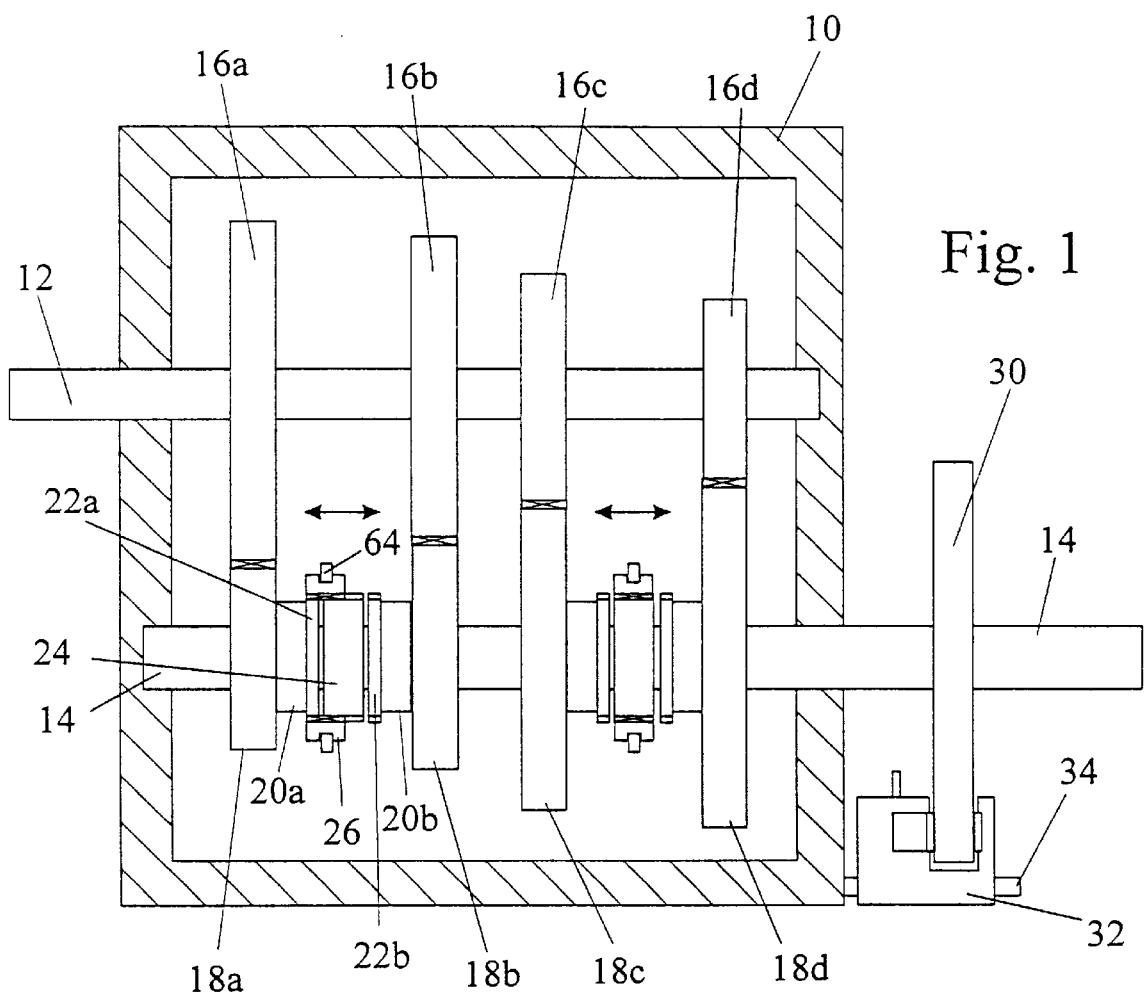
FIG. 1 is a schematic section through a mechanical final drive gearbox of a harvester.

The mechanical gearbox 10 is shown in more detail in FIG. 1 and has two shafts journalled in the housing, one being the input shaft 12 and the other the output shaft 14, as described by reference to FIG. 6. The illustrated gearbox 10 has four gear ratios set by four permanently engaged pairs of gears 16a to 16d and 18a to 18d. The gears 16 are fast in rotation with the first shaft 12 while the gears 18 are freely rotatable on the second shaft 14. To select one of the four available drive ratios, one of the gears 18 is locked to the second shaft 14 using one of two selector mechanisms, the first arranged between the gears 18a and 18b for selecting 1st or 2nd gear and the other arranged between the gears 18c and 18d for selecting 3rd or 4th gear. The two selector mechanisms have the same construction and, in the interest of clarity, reference numerals have only been used in the drawing for the mechanism for selecting 1st and 2nd gear.

Each of the gears 18 is connected by a respective collar 20 for rotation with a cog 22. Each gear 18 is either formed integrally with, or permanently connect to, its associated collar and cog 22 for rotation in unison about the shaft 14. The selector mechanism comprises a carrier 24 that is fast in rotation with the shaft 14, being for example splined onto the shaft 14 or locked relative to the shaft 14 by a key. The carrier 24 also has external teeth that mesh with internal teeth on a synchroniser 26 that can slide axially on the carrier 24. The synchroniser 26 has a circumferential groove engaged by a selector fork 64 that moves the synchroniser 26 in the direction indicated by the double headed arrow in FIG. 1 to select 1st or 2nd gear, or to select neither gear when in its neutral central position. Only the ends of the selector fork 64 can be seen in FIG. 1 as it lies behind the synchroniser in the section of this drawing.

When the synchroniser 26 is in its central position, as shown for the selector mechanism arranged between the gears 18c and 18d, the synchroniser 26 does not engage either of the cogs 20a and 20b and there is therefore no torque transmitted through it from the carrier 24 to either of the gears 18a and 18b. When however the selector fork 64 moves the synchroniser 26 to the position shown in FIG. 1, then its internal teeth simultaneously engage with the carrier 24 and the cog 22a, thereby coupling the gear 18a for rotation with the shaft 14 and engaging 1st gear. Similarly, if the synchroniser 26 is moved to the right, as viewed, torque can be transmitted through the gears 16b, 18b.

Figure 2:
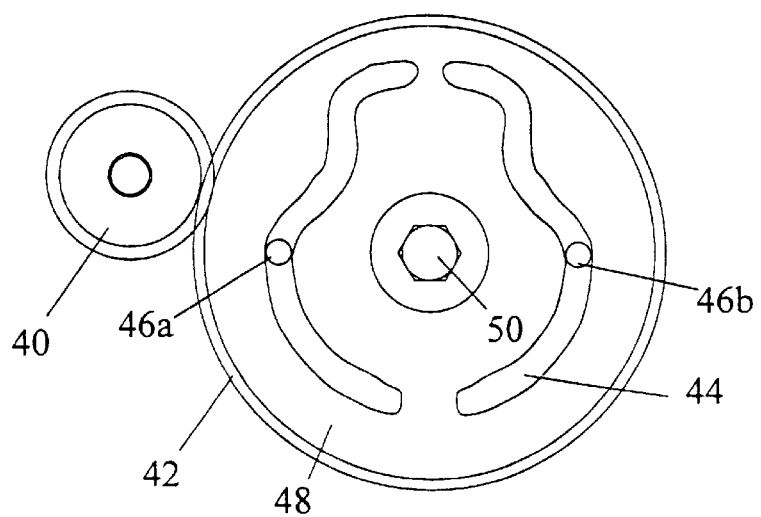
FIG. 2 is a schematic representation of part of the gear selection mechanism of the gearbox of FIG. 1.

Two selector forks are provided in the transmission box one for each of the synchronisers 26. The selector forks are slidably mounted on a rod that extends parallel to the shaft 14 and lies in a different plane from the section of FIG. 1. A cam plate 48 as shown in FIG. 2, having two cam grooves 44 is mounted by means of a bolt 50 within the gearbox 10 for rotation about an axis normal to the plane of FIGS. 1 and 2. Cam followers 46a and 46b secured respectively to the two selector forks 64 engage within the cam grooves 44. The cam plate 48 has external teeth 42 that mesh with a motor driven cog 40. As the cam plate 48 is rotated by the motor, the engagement of the followers 46a and 46b in the grooves 44 results in the selector forks moving in synchronism with one another along their support rod, thereby moving the synchronisers 26.

In the position illustrated in FIG. 2 both selector forks are in a neutral position. When the plate is rotated counter-clockwise as shown, the follower 46b will move along a section of the cam groove 44 that has a constant radius and will therefore remain in the neutral position. The follower 46a on the other hand will first move to the right, i.e. nearer to the axis of rotation of the cam plate 48, thereby engaging 2nd gear and further counter-clockwise rotation of the cam plate 48 will move the follower 46a to the left of its illustrated position to engage 1st gear. In the opposite direction of rotation, the 1st/2nd gear synchroniser will remain in neutral while the other synchroniser moves to engage first 3rd gear then 4th gear.

Figure 7:
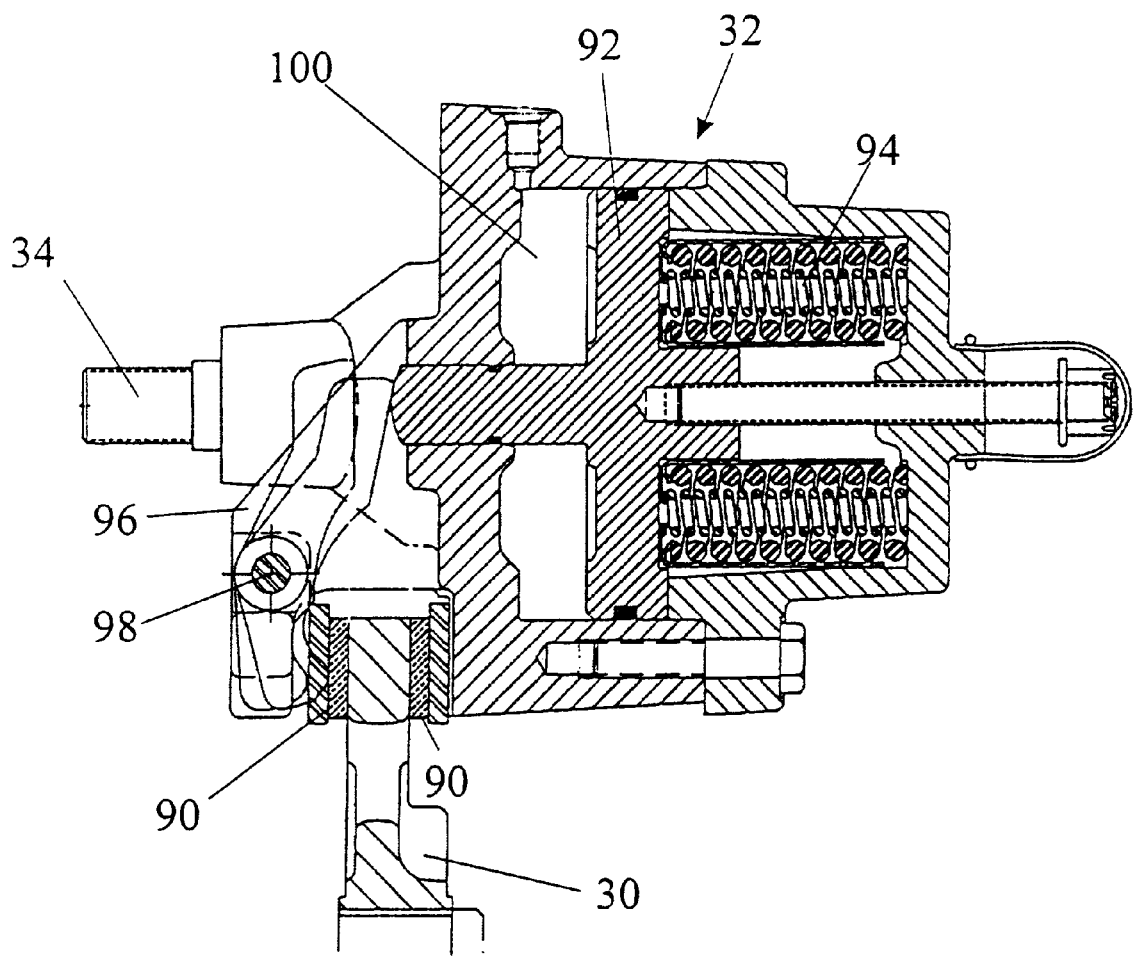
FIG. 7 is a section through a brake calliper for braking the harvester.

A brake disk 30 is mounted on the output shaft 14 of the gearbox 10 for braking the harvester before attempting to change the gear ratio selection within the gearbox 10. The brake disk 30 is straddled by a fail-safe brake calliper 32 slidable on a shaft 34 and shown in detail in the section of FIG. 7. The brake calliper 32 has two brake pads 90 that can grip the brake disk 30 to prevent it from rotating. The entire housing of the calliper 32 floats in relation to the brake disk 30 in that it can slide freely along the shaft 34. A piston 92 within the calliper housing is urged to the left as viewed by springs 94 and can be moved to the right against the force of the springs 94 by applying a hydraulic pressure to a working chamber 100 to the left of the piston. The latter working chamber is connected to a pressure supply and a return line by a solenoid valve (not shown) that is controlled in the manner to be described below to brake the harvester automatically before attempting to change the final gear ratio. When the working chamber 100 is not under pressure, the piston 92 moves to the left, as viewed, under the action of the springs 94. An extension of the piston then acts on a reaction lever 96 to pivot it anti-clockwise as viewed thereby narrowing the gap between the pressure pads 90 and braking the output shaft 14 of the gearbox. Conversely, when pressure in the working chamber 100 moves the piston 92 to the right, as viewed, then the gap between the pads 90 is widened to release the brake disk 30.

The manner in which a gear ratio is selected will now be described by reference to FIGS. 3, 4 and 5. A panel 52, shown in FIG. 3, is provided that has buttons 54 which are manually depressed by the driver to select the final drive ratio of the mechanical gearbox 10. There are four buttons 54 for 1st to 4th gear, a button marked "N" for neutral and another marked "P" for park. In the park position, the brake 32 is actuated by connecting the working chamber 100 to the return line. Besides for maintaining the harvester in a parked position, the park button also may be used as an emergency brake when the harvester is moving and should be brought to an immediate stop. The brake 32 is fail-safe in that if the pressure supply to the working chamber 100 should fail for any reason, it will automatically stop movement of the harvester. In the steady state selected by the other buttons 54, apart from the neutral button, the calliper brake 32 is not applied.

Alongside each button 54 on the control panel 52, there is arranged an LED 56. One of these LED's 56 is lit at any one time to indicate which final drive gear ratio has been selected.

Both the buttons 54 and the LED's 56 are connected to a control circuit 60 that is shown in FIG. 4. The control circuit 60 also receives a signal from a switch 58 indicating when the hydrostatic handle is in its neutral position and provides output signals to the solenoid valve of the brake calliper 32, to the foot-on-inch valve 84, to a hydrostatic control circuit 85 and to the motor drive cog 40 of the gear selection mechanism. The operation of the control circuit 60 will now be described with reference to FIG. 5 that shows the signals appearing at its inputs A and C and its outputs B, D, E and F.

Initiation of a gear change is effected by the driver by moving the hydrostatic handle to a neutral position shown by the step-down of input C and momentarily depressing a button 54 to produce the single pulse shown on input line A. As soon as such a pulse is received, the control circuit 60 produces a signal on line B that applies the calliper brake 32 by connecting its working chamber 100 to the return line through its solenoid valve. Simultaneously, the current to the hydrostatic pump 76 is cut (represented by waveform D) whereby the swash plate of the pump is returned to an idle position preventing the hydrostatic motor from being driven.

By moving the hydrostatic handle to neutral and as the brake automatically is applied, the speed of the harvester is reduced. After a predetermined time lapse 40B thought sufficient under all circumstances to bring the harvester to a complete standstill, a signal is applied over output line E to open the foot-on-inch valve 84 which prevents a residual torque from being maintained in-between the hydrostatic transmission 74 and the gearbox 10. Such a torque namely would hamper the disengagement of a previously engaged gear when selecting a new gear due to elevated frictional forces in-between the teeth of a cog 22 engaged with its associated synchroniser 26. Concurrently a signal is also applied to the motor of the gear selection mechanism to turn the cog 40 and with it the cam plate 48. Because of the steps described above and because of the design of the synchroniser 26, the cam plate 48 can rotate easily. It therefore suffices to use a stepper motor to drive the selection mechanism and to apply a predetermined number of pulses to move the cam plate 48 to the desired position.

Alternatively, as the angular position of the cam plate 48 is related to the position of the selector forks, closed loop control with feedback from a cam plate position sensor may be employed to move the cam plate 48 to the position corresponding to the desired gear ratio. It will be appreciated that instead of relying on the predetermined time lapse between the depression of the gear selection button 54 and the effective actuation of the gear selection mechanism 40 in the gearbox 10, the speed of the harvester may be monitored by a speed sensor 40A to ensure that the harvester has stopped completely before activating the gear selection mechanism 40.

Once the gear selection movement has been completed, the signals on output lines B and E are used to release the brake 32 and close the foot-on-inch valve 84 to allow torque to be applied to the drive axle 70. The harvester may now again move, as represented by the last step-up of input line C, on condition that the current to the hydrostatic control circuit 85 has been restored. This normally is effected automatically after a gear change has been completed. However, if the harvester operator accidentally moved the hydrostatic handle out of its neutral position during a gear shift and failed to return the handle to neutral before the gear shift was finalized, then the current to the hydrostatic control circuit 85 would not automatically be restored. To restore the current and hence before being able to start moving the harvester, the operator will have to return the handle to neutral, as represented by the last step-down of input C, and then move it out of neutral again in the desired direction of travel. It is clear that the above measure is taken for safety reasons to prevent the harvester from setting off inadvertently with a jerk after a gear change has been effected.

Also for safety reasons, pushing a gear selection button 54 while the hydrostatic handle is not in its neutral position will have no effect so as to prevent that the harvester unwillingly would come to an immediate stop.

For as long as the signal on line B is present, a pulsed signal is applied on output line F to the LED 56 alongside the button 54 corresponding to the newly selected final drive ratio. This acts as confirmation to the driver that his request for a change of drive ratio has been sensed and that a change of ratio is in progress. This also informs the driver that it is useless to attempt any further manoeuvres until the change has been completed. Once the desired gear ratio has been engaged, the LED 56 remains on permanently to remind the driver of which final drive ratio is currently engaged.

It will be clear to those skilled in the art that various modification may be made to the described preferred embodiment of the invention without departing from the scope of the appended claims. For example, although in the present invention the harvester is brought and maintained at a standstill by means of the calliper brake 32, which already has the function of a parking brake, it is equally well conceivable to employ the foot brakes of the harvester to carry out the same function.

What is claimed is:

1. A method of selecting a final drive gear ratio in a harvester hydrostatic transmission comprising the steps of selecting the desired ratio by manually depressing a button on a control panel, manually placing the hydrostatic transmission into neutral before the automatic change in final drive ration can be performed, automatically activating a brake to bring and maintain the harvester at a standstill in response to the depression of the button on the control panel, and activating a gear selection mechanism to select the desired gear ratio only after the harvester has come to a complete stop.

2. A method as claimed in claim 1, wherein a warning is provided during the period between the depression of a button on the control panel to select a desired gear and the eventual activation of the gear selection mechanism of the gearbox to select the desired gear ratio.

3. A method as claimed in claim 2, wherein the brake is operated for a fixed length of time which brings the harvester to a standstill.

4. A system for selecting the drive ratio of a multiple ratio mechanical gearbox in a harvester having an engine connected to drive the harvester through a transmission line that includes the said mechanical multiple ratio gearbox and having a brake for preventing movement of the harvester, the system comprising:

a. an electrical gear selection panel having a plurality of buttons for manual selection of the desired drive ratio;

b. a gear selector mechanism on the gearbox;

c. a gear change actuator for displacing the gear selector mechanism to select the desired gear;

d. an electrical control circuit for energising the gear change actuator in response to manual depression of a button on the gear selection panel;

e. a manual hydrostatic gear lever; and f. a control circuit responsive to both the placing of the hydrostatic lever into neutral and the pushing of the button to energize the gear change, whereby the electrical control circuit is operative to actuate the brake to bring and maintain the harvester at a complete stop before energising the gear change actuator to effect a gear change.

5. A method as claimed in claim 4, in which means are provided to prevent torque transmission from the engine of the harvester to the input shaft of the gearbox and in that the latter means are also energised prior to activation of the gear selection mechanism.

6. A method as claimed in claim 5, in which the input shaft of the gearbox is connected to the engine of the harvester through a hydrostatic transmission that comprises a pump connected to a hydraulic motor, and wherein torque transmission from the engine of the harvester to the input shaft of the gearbox is prevented by bringing the pump in an idle condition and opening a "foot-on-inch" valve connected in shunt with the hydraulic motor of the hydrostatic transmission.

7. A system for selecting the drive ratio of a multiple ratio mechanical gearbox in a harvester having an engine connected to drive the harvester through a transmission line that includes the said mechanical multiple ratio gearbox and having a brake for preventing movement of the harvester, the system comprising:

a. an electrical gear selection panel having a plurality of buttons for manual selection of the desired drive ratio;

b. a gear selector mechanism on the gearbox;

c. a gear change actuator for displacing the gear selector mechanism to select the desired gear; and d. an electrical control circuit for energising the gear change actuator in response to manual depression of a button on the gear selection panel, whereby the electrical control circuit is operative to actuate the brake to bring and maintain the harvester at a complete stop before energising the gear change actuator to effect a gear change.

8. A system as claimed in claim 7, wherein means are provided on the gear selection panel to provide a warning during the period between the depression of a button on the control panel to initiate a gear change and the actual completion of said gear change.

9. A system as claimed in claim 8, in which the brake is operated for a fixed length of time which brings the harvester to a standstill.

10. A system as claimed in claim 8, further comprising a sensor for sensing the speed of the harvester and means for monitoring the output of the speed sensor to ensure that the harvester has come to a complete stop before the gear selection mechanism is activated.

11. A system as claimed in claim 10, in which means are provided to prevent a torque transmission from the engine of the harvester to the input shaft of the gearbox during operation of the gear selection mechanism.

12. A system as claimed in claim 11, wherein the input shaft of the gearbox is connected to an engine of the harvester by way of a hydrostatic transmission comprising a swash plate pump and a motor and wherein the control circuit is further operative to bring the pump in an idle condition and to open a "foot-on-inch" valve for short circuiting the lines connecting the pump to the motor to permit the gearbox input shaft to rotate freely prior to the gear change actuator being energised.

13. A system as claimed in claim 12, wherein the brake for preventing movement of the harvester is a fail-safe hydraulic calliper brake having pads acting on a brake disk coupled to the output shaft of the gearbox, the friction pads being resiliently urged into a braking position and being moved into a released position by application of hydraulic pressure to a working chamber of the brake calliper.

\* \* \* \* \*